United States Patent [19]
Walraven

[11] 3,915,644
[45] Oct. 28, 1975

[54] METHOD AND APPARATUS FOR DETERMINING CONCENTRATIONS BY THE ANALYSIS OF REACTION RATES IN CONTINUOUSLY AND DISCONTINUOUSLY FLOWING SAMPLES

[75] Inventor: Willem Walraven, Breda, Netherlands

[73] Assignee: Cenco Medical Industries, Inc., Chicago, Ill.

[22] Filed: Mar. 26, 1974

[21] Appl. No.: 455,007

[30] Foreign Application Priority Data
Mar. 27, 1973 Netherlands ...................... 7304229

[52] U.S. Cl. ............ 23/230 R; 23/253 R; 195/103.5
[51] Int. Cl.² .................. G01N 31/14; G01N 21/20; G01N 21/16
[58] Field of Search .......... 23/253 R, 253 A, 230 R, 23/230 A, 259; 195/103.5, 127

[56] References Cited
UNITED STATES PATENTS

| | | | |
|---|---|---|---|
| 3,230,048 | 1/1966 | Skeggs | 23/253 R |
| 3,341,299 | 9/1967 | Catravas | 23/253 X |
| 3,589,868 | 6/1971 | Hozumi | 23/253 X |
| 3,690,833 | 9/1972 | Ferrari | 23/253 X |

Primary Examiner—R. E. Serwin
Attorney, Agent, or Firm—Haight, Hofeldt, Davis & Jambor

[57] ABSTRACT

A method and apparatus for determining the concentration of a substance in a fluid is disclosed. The substance is mixed with one or more other components in a duct to form a reaction mixture of which at least one physical or chemical property undergoes a measurable change during a certain time span after formation of the mixture, the rate of change being dependent upon the concentration of the substance. Appropriate detecting and analyzing devices are utilized to transform the rate of change in the property into an indication of the concentration.

13 Claims, 2 Drawing Figures

METHOD AND APPARATUS FOR DETERMINING CONCENTRATIONS BY THE ANALYSIS OF REACTION RATES IN CONTINUOUSLY AND DISCONTINUOUSLY FLOWING SAMPLES

BACKGROUND OF THE INVENTION

1. Field of the Invention

This invention relates generally to measuring the concentration of a substance in a fluid, and, more specifically, this invention relates to a method and apparatus for determining the concentration of a substance in a fluid by measuring the rate of a property change that occurs during reaction of the substance with an appropriate reagent.

2. Description of the Prior Art

In chemistry, and more particularly in clinical chemistry, concentrations of certain substances, such as, for instance, enzymes, are measured by the speed with which a change occurs in a property of a reacting mixture during a specific reaction. This can, for instance, be a change in the color or opacity of a reacting mixture, which can be graphically represented as a function of the reaction time. With this graphical representation (which may be produced, for instance, by means of a recorder), and assuming that the measured value is represented on the Y-axis and the time on the X-axis, a graph will result whereby over that part of the reaction where the reaction rate is constant, the graph will be a straight line which will form an angle with the X-axis, which angle is determined by the amount of reaction that is occurring and therefore is indicative of the concentration of the substance being measured. The difficulty with this approach is that the part of the graph that does not run paralled to the X-axis must be analyzed to determine whether this line is straight, that is to say whether the reaction rate is constant. It is then necessary to determine the angle of this line and then, via a conversion of the angular value and a multiplication factor which in itself is a function of the angular value, convert it into a concentration value. This makes the method visually, as well as electronically, complicated. Therefore, checking via visual measuring and calculating the electronic values is time-consuming.

SUMMARY OF THE INVENTION

The method of this invention is achieved by adding the samples to be analyzed and an appropriate reagent or reagents in a conduit. A constant flow rate or velocity is achieved in the conduit by an appropriate pumping apparatus, which introduces both the reagent and the fluid sample containing the substance of which the concentration is to be measured into the conduit to form a reaction mixture. At least two measuring sites downstream from the mixing point are designated in the conduit, where simultaneous measurements are made on a property which changes during the reaction of the reagent at a rate determined by the concentration of the substance. The relationship between the two measured values, such as the difference therebetween, may be compared to determine the extent to which the reaction progresses during the time that the reaction mixture takes to flow from one measuring site to the next. The difference values may be registered by an appropriate recording device. If the measured values do not change at the measuring sites, this will result in a constant resultant signal, which on a graphical display will run parallel to the time-axis. The amplification of the signal by electronic means is simply effected and can be undertaken with a view to a direct representation of the concentration units, which manifests itself as the distance between the horizontal lines and a zero-line which can be read from the graphpaper. As a result of the constant flow speed in the conduit, to which at set times samples to be analyzed are added, which may or may not be separated by blanks or rinsing liquids, it is accurately known at which times after a sample has been added to the stream a reaction commences, and when the reaction mixture is present at the measuring sites in suitable states of the reaction for comparison of the measurements. Thus, it is possible to have a measuring value printed at fixed times after each sample-addition, for instance by a printing digital voltmeter of other printing device. By measuring each sample more than once at short-time intervals, each printing designated by the same identification number for the sample, a fast visual check on the linearity of the reaction is possible without having to inspect the recorder, as the constancy of the measured values confirms the linearity.

By changing the flow speed it is possible to change the time-difference between the measuring sites and the mixing point and thereby change the resultant position of the measured values on a graphical display. By stopping the fluid stream after it has flowed for some time with a constant flow speed through the measuring sites, it is possible, while conserving the difference in the reaction time, to diminish measuring errors introduced by flow phenomena and shift the measuring times with regards to the mixing point. To achieve this operation, the drainline or drainlines after the mixing points are returned to the suction side of the pump, so that movement of the fluid through free drainage after stopping the pump is prevented by eliminating free drainage.

These and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

Figure 2:
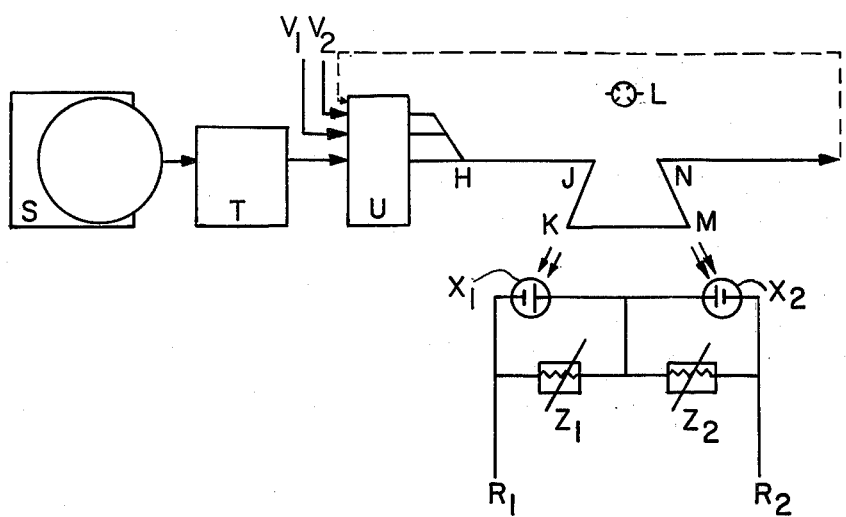
FIG. 2 shows a schematic diagram of an apparatus for applying the method of the present invention.

With reference to FIG. 2 of the drawing, a supply of the fluid containing the substance of which the concentration is to be measured is stored in the container S. A sample extracting device T draws a sample of the fluid from the supply S by means of a tubing pump U for a designated period of time. Two or more different concentrations of the substance may be maintained at source S for sampling. The tubing pump U also forces a reagent or reagents through a conduit at a predetermined constant velocity or flow rate. A source of the reagent is indicated in $V_1$, and another liquid source is indicated at $V_2$, although this latter is not a necessary part of the system. Also, additional reagents or other additional components may be utilized, if desired.

At the beginning of the test sequence, the sample extracting device T and the pump U insert a sample of the fluid containing the substance into the conduit at a point H, where the fluid sample and the reagent are mixed to form a reaction mixture. The reaction mixtures flows past measuring sites that are spaced along the conduit. A measuring device is utilized to measure, at each site, a property of the mixture that is known to change during reaction of the reagent at a rate determined by the concentration of the substance. Any appropriate property may be measured, but in this preferred embodiment the color or opacity of the liquid in the conduit is measured.

Accordingly, the reaction mixture is caused to flow through two flow cells (the measuring sites) of a Colorimeter, whereby the light of a lightsource L passes through the optical paths in these cells identified, respectively, as J-K and N-M. The light passing through the flow cells J-K and N-M falls on two photocells (photoelectric cells) $X_1$ and $X_2$, respectively, which, as indicated in FIG. 2, can be regulated by appropriate setting of the variable impedances $Z_1$ and $Z_2$ (such as variable resistors). In this preferred embodiment, impedances $Z_1$ and $Z_2$ are set so that if the same quantity of light falls on both cells, electrical signals of the same magnitude but opposite polarity are produced on terminals $R_1$ and $R_2$. The difference between the voltages on terminals $R_1$ and $R_2$ is detected and then applied to an appropriate comparing device, such as a recorder, the resulting product of which is illustrated in FIG. 1 by curve 2.

Figure 1:
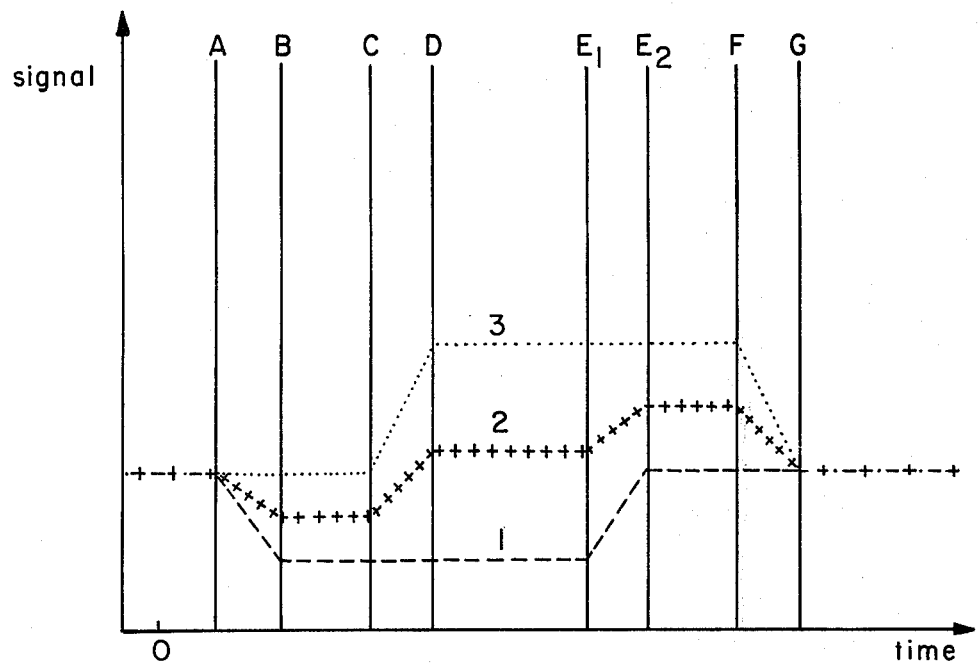
FIG. 1 is a schematic graphical representation of the measuring signals of the present invention for purposes of illustrating the operation of this invention.

In the graph of FIG. 1, a sequential representation of the output potentials of the photocells $X_1$ and $X_2$ and of a resultant, that is to say, the difference between the voltage potentials on terminals $R_1$ and $R_2$, is given for the case when a reacting mixture, preceded by a neutral fluid and followed by a neutral fluid, is pumped through the system. The output voltage of the first photocell $X_1$ is here represented by the curve 1. The output voltage of the second photocell $X_2$ is represented by the curve 3. The resultant signals, the difference between the potentials at points $R_1$ and $R_2$ is represented by the curve 2. It should be recognized that the curves of FIG. 1 are for purposes of explanation only and that in practice the curves 1 and 3 would not coincide with nor cross over curve 2 at any point with the preferred approach utilized herein.

The O-point on the time-axis indicates the moment at which a sample arrives at the mixing point H, while a neutral mixture is still present in the remainder of the conduit.

The time A indicates when the reaction mixture enters the first flow-cell at point J. The time B indicates when the first flow-cell is completely filled with the reaction mixture up to point K, after which the reaction mixture at the time C enters the second flow-cell M-N at point M. The time D indicates when the second cell M-N is completely filled with a reaction mixture, which then begins to pass point N. The time $E_1$ indicates when the rinsing liquid, following the sample, begins to pass point J and gradually starts to replace the sample in the first flow-cell J-K. The time $E_2$ indicates when the first flow-cell J-K is completely filled with the rinsing liquid. The time F indicates when the rinsing liquid starts to pass the point M and the time G when the rinsing liquid begins to pass the point N.

During the time period D/E, the outputs of the photocells $X_1$ and $X_2$ represent the average reaction state at each measuring site from point of entry to point of exit at the site at a constant time differential during the reaction. This is so because the reaction mixture is at each measuring site and the constant velocity of the flow means that during this time period the reaction state at each measuring site remains the same, with the reaction state in flow-cell M-N being at a time subsequent to the time of the reaction state in flow-cell J-K that is determined by the distance between K and M.

It is clear that during the time-intervals A/B, C/D, $E_1/E_2$ and F/G a liquid flows through the flow-cells and the mean optical density in one of the flow-cells undergoes a change during each of these time intervals. This causes curve 2 to run horizontal only during the time-intervals B/C, D/$E_1$ and $E_2$/F. If so wished, by choosing a smaller distance between the points K and M, and thereby a smaller conduit volume between the points K and M than that of the flow-cells J-K and M-N, the horizontal parts of the signal 2 in the time-intervals B/C and $E_2$/F can be eliminated. Thus, for an analysis between the times A and G, there would be only one time-interval, to wit D/$E_1$, where the resultant has a horizontal course, so that a faster visual inspection is possible.

If the volume between the points K and M cannot be sufficiently diminished, the cells J-K and M-N can be placed in paralled branches of the conduit. In this way, the difference in distance between H and J and between H and M can be made just as small as necessary, whereby the flow-thru-speed in these branches can be regulated by having the conduit beyond the measuring sites connected to the suction side of the pump, as indicated by the dotted lines in FIG. 2.

The time-interval D/$E_1$ is determined by the time of sample-taking by the device T, the pumping speed and the volumes of the conduits. The difference in height between the signal during the interval D/$E_1$ and the time-interval G/A (i.e., prior to A and after G) is a direct quantitative indication of the concentration of the substance in the sample fluid.

In the extracting device T, a timer can be adjusted so that it will start to run at the commencement of the introduction of a sample and will effect a connection during the time-interval D/$E_1$ between the voltage potentials at terminals $R_1$ and $R_2$ and an adjustable amplifier, with the difference potential being applied to a printing digital voltmeter. The amplitude of the printed value obtained in this way can be expressed directly in the required standard concentration units.

It should be understood that various modifications, changes and variations may be made in the arrangements, operations and details of construction of the elements disclosed herein without departing from the spirit and scope of this invention.

I claim:

1. A method of determining the concentration of a substance in a fluid comprising:

passing a reagent that reacts in the presence of the substance of which the concentration is being measured through a conduit at a predetermined constant velocity;

inserting a sample of the fluid into the conduit for a designated period of time to form a reaction mixture;

measuring a physical or chemical property, which is known to change during the reaction of the reagent at a rate determined by the concentration of the substance, at spaced sites along the conduit downstream of the point where the sample of the substance is introduced into the conduit, so that the reaction states at the sites differ during certain time periods by a constant amount representing a fixed time differential of the reaction;

determining the difference between the measurements at the spaced sites during a time when the reaction states at the sites are such that constant measurements are produced; and comparing the difference in the measurements of the reaction mixture with the difference when only the reagent is present to determine the concentration of the substance.

2. A method as claimed in claim 1 wherein said measuring step comprises measuring the opacity of the reagent and the reaction mixture.

3. A method as claimed in claim 1 wherein said passing and inserting steps further comprise moving the reaction mixture through parallel branches of the conduit with differing flow rates, a measurement site being located in each of the branches.

4. A method as claimed in claim 1 wherein said passing step further comprises passing another liquid through the conduit with the reagent.

5. A method as claimed in claim 1 wherein said passing step further comprises varying the flow through the conduit to adjust the time difference between measurements at the measuring sites.

6. A method as claimed in claim 1 wherein said passing step further comprises stopping the flow through the conduit to reduce the effects of flow phenomena and shift the measuring times.

7. An apparatus for determining the concentration of a substance in a fluid comprising:
a source of a reagent that reacts with the substance of which the concentration is being measured;
a conduit;
pump means to force said reagent through said conduit at a predetermined constant velocity;
a supply of the fluid containing the substance;
a sample extracting means to draw fluid from said supply for a designated period of time, said pump means inserting the fluid into said conduit to form a reaction mixture;
first and second spaced measuring sites in said conduit;
measuring means at said measuring sites to measure a property of the liquid flowing through said conduit, said property being a property that is known to change during reaction of said reagent at a rate determined by the concentration of the substance;
detecting means to produce a signal indicative of the difference between the measurements at said measuring sites; and
comparing means to compare the output of said detecting means when only reagent is in the conduit and the output of said detecting means when said reaction mixture is at said measuring sites and the measurements of said measuring means at both sites is constant to thereby determine the concentration of the substance in the fluid.

8. Apparatus as claimed in claim 7 wherein said pump means is a tubing pump.

9. Apparatus as claimed in claim 7 wherein:
said conduit comprises parallel branches having different flow rates therein; and
one of said measuring sites is located in each branch.

10. Apparatus as claimed in claim 7 wherein said measuring means comprises:
a light source; and
a photoelectric cell at each of said measuring sites, each of said cells positioned with said conduit between the photoelectric cell and said light source.

11. Apparatus as claimed in claim 7 wherein said comparing means comprises a recorder to register the output of said detecting means and provide a graphical representation so that the concentration of said substance may be readily determined.

12. Apparatus as claimed in claim 7 wherein said pump means is also connected to said conduit downstream of said measuring sites preventing free drainage from said conduit, whereby stopping said pump means fixes the conditions in said conduit by eliminating the effects of flow phenomena.

13. An apparatus for determining the concentration of a substance in a fluid comprising:
a source of a reagent that reacts in the presence of the substance of which the concentration is being measured;
a conduit;
a tubing pump to force said reagent through said conduit at a predetermined constant velocity;
a supply of the fluid containing the substance of which the concentration is being measured;
a sample extracting means to draw fluid from said supply for a designated period of time, said tubing pump inserting the fluid into said conduit to form a reaction mixture;
first and second measuring sites located along said conduit with a predetermined spacing therebetween;
a light source located in the vicinity of said measuring sites;
a first photoelectric cell located on the side of said conduit opposite said light source at said first measuring site;
a second photoelectric cell located on the side of said conduit opposite said light source at said second measuring site, said first and second photoelectric cells detecting changes in the opacity of the liquid in said conduit, the opacity of the liquid changing during reaction of said reagent at a rate determined by the concentration of the substance;
detecting means to produce a signal indicative of the difference between the voltage potentials produced by said photoelectric cells;
adjusting means to set said difference signal produced by said detecting means at a desired level prior to production of said reaction mixture; and
recording means to continuously register said difference signal produced by said detecting means in a graphical representation so that the concentration of the substance may be readily determined by comparing the graphical representations when only said reagent is in said conduit and when said reaction mixture is in said conduit.

* * * * *